April 15, 1958
A. HAHNEL
2,831,116
REGENERATIVE FREQUENCY DIVIDER
Filed July 9, 1956
FIG. 1
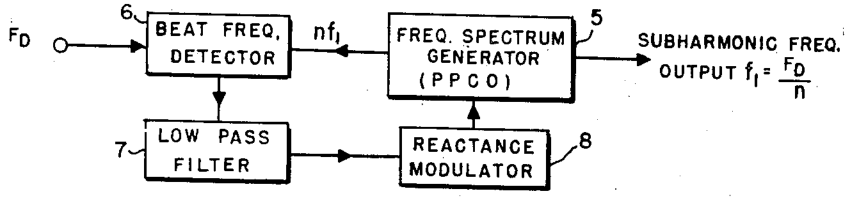
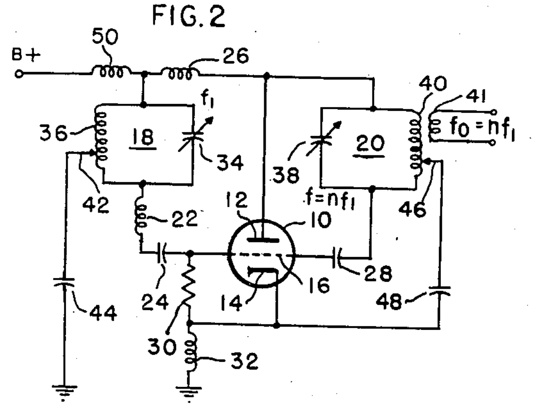
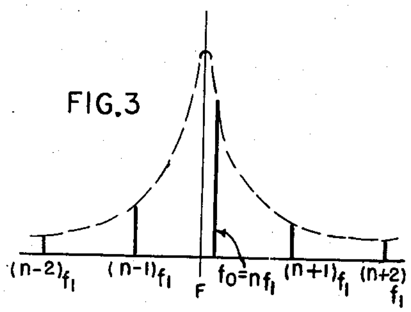
FIG. 4
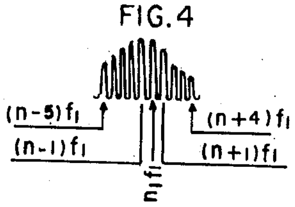
FIG. 5
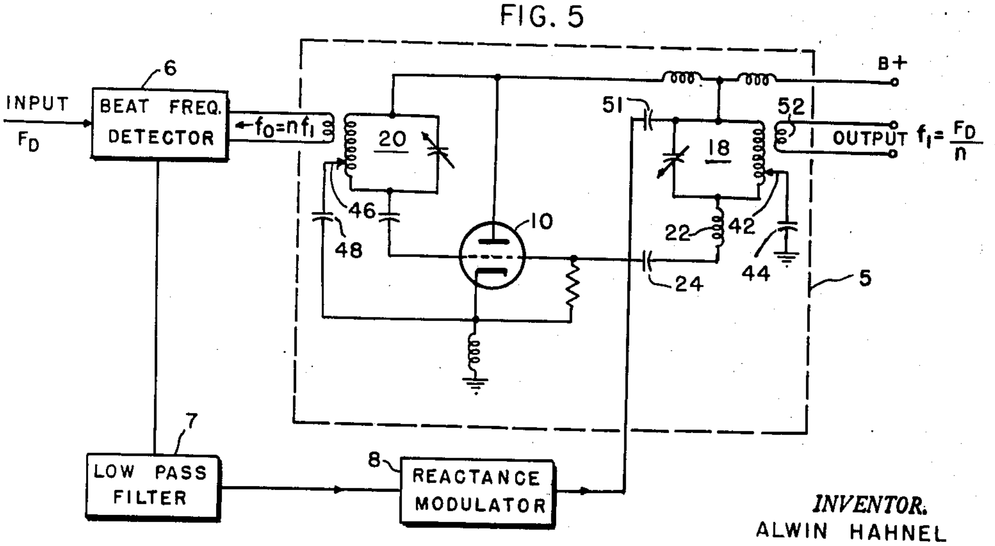
INVENTOR.
ALWIN HAHNEL
BY [signature]
ATTORNEY United States Patent Office 2,831,116
Patented Apr. 15, 1958

2,831,116

REGENERATIVE FREQUENCY DIVIDER

Alwin Hahnel, Little Silver, N. J., assignor to the United States of America as represented by the Secretary of the Army Application July 9, 1956, Serial No. 596,799

5 Claims. (Cl. 250—36)

(Granted under Title 35, U. S. Code (1952), sec. 266)

The invention described herein may be manufactured and used by or for the Government for governmental purposes, without the payment of any royalty thereon.

This invention relates to frequency divider circuits and more particularly to regenerative frequency divider circuits having variable division factors.

Conventional regenerative frequency divider circuits usually employ a modulator having a filter in the output circuit thereof tuned to the desired submultiple frequency of a driving source frequency. The submultiple frequency component derived from the filter is applied to a multiplier which provides a harmonic output signal which is also applied to the modulator. The beat frequency derived from the driving signal and the harmonic output signal provides the frequency division signal which is to be utilized. Such circuits require high gain tubes and it has been found that stable operation usually cannot be obtained for frequency division ratios of greater than 10 to 1 without cascading a plurality of such regenerative frequency dividers.

Accordingly, it is an object of the present invention to provide an improved regenerative frequency divider circuit wherein high frequency division ratios may be achieved.

It is another object of the present invention to provide a regenerative frequency divider circuit in which any one of many available division factors may be selected by the tuning of a single resonance circuit.

In accordance with the present invention there is provided a regenerative frequency divider circuit for producing a desired subharmonic of a prescribed signal frequency. Included is a periodically-phase-controlled oscillator having means for simultaneously generating a fundamental oscillation frequency and an oscillation frequency harmonically related thereto. The fundamental frequency is substantially equal to the subharmonic desired and controls the harmonically related frequency such that the harmonic frequency is substantially equal to the prescribed frequency. Also included are means responsive to the prescribed frequency and the multiple frequency for producing an output signal whose phase is related to the algebraic sign of the frequency error between the prescribed and multiple frequency. In addition, there is included means in circuit with the fundamental oscillation generating means and responsive to the output signal whereby the fundamental frequency is varied in a manner to drive the multiple frequency towards the prescribed frequency, the fundamental frequency being equal to said desired subharmonic when the prescribed frequency and the multiple frequency are in phase-lock.

For a better understanding of the invention together with other and further objects thereof, reference is had to the following description taken in connection with the accompanying drawings in which:

Fig. 1 is a block diagram of the regenerative frequency divider in accordance with my invention;

Fig. 2 is a schematic diagram of a periodically-phase-controlled oscillator which forms one component of the system shown in Fig. 1;

Figs. 3 and 4 are explanatory curves; and

Fig. 5 shows schematically the operative connections of the periodically-phase-controlled oscillator in the system.

Referring now to Fig. 1 of the drawing, there is shown a regenerative frequency divider circuit comprising a frequency spectrum generator 5, a beat frequency detector 6, a low-pass filter 7 and a reactance tube modulator 8. The frequency spectrum generator 5 provides simultaneous oscillations at a prescribed fundamental frequency and frequencies which are multiples thereof. One such circuit wherein multiplication factors as high as 500 are obtainable is described in detail in my copending application Serial No. 564,088, filed February 7, 1956, and is shown in Fig. 2.

Referring now to Fig. 2 of the drawing, the frequency spectrum generator shown therein comprises an electron discharge device 10 having an anode or plate 12, a cathode 14 and a control grid 16. Two discrete tuned resonant circuits 18 and 20, each comprising a parallel arrangement of an inductance and a capacitance, are coupled between grid 16 and plate 12. One terminal of resonant circuit 18 is coupled to grid 16 through series connected inductance 22 and capacitor 24 and the other terminal of circuit 18 is connected to plate 12 through inductance 26. Plate 12 is connected directly to one terminal of tuned circuit 20 and grid 16 is coupled to the other terminal of circuit 20 through capacitor 28. A resistor 30 is connected between grid 16 and cathode 14 to provide a common grid-leak resistor in circuit with both capacitor 24 and capacitor 28. Cathode 14 is connected to ground through choke 32 which functions as a conventional isolating choke for very high radio frequencies. The values of tuning capacitor 34 and inductance 36 comprising resonant circuit 18 are such that this circuit will resonate over a prescribed range of fundamental frequencies designated as $f_1$. Similarly, the values of tuning capacitor 38 and inductance 40 comprising resonant circuit 20 are such that circuit 20 will resonate over a prescribed range of frequencies. Resonant circuit 20 may be tuned to a preselected frequency $F \doteq nf_1$ within the desired output range, $nf_1$ being the desired multiple output frequency $f_0$ of the fundamental frequency $f_1$. To distinguish between preselected frequency F and the desired multiple frequency $f_0 = nf_1$, $f_0$ will hereinafter be referred to as the output frequency. Resonant circuit 20 is conventionally coupled to an output circuit 41, which as explained hereinbelow, provides an output of the desired output frequency $f_0 = nf_1$. A regenerative feedback control circuit for the selected fundamental frequency $f_1$ from resonant circuit 18 is provided by means of a movable tap 42 adapted to be varied in position along inductance 36 and which is coupled to ground through blocking capacitor 44. Similarly, a regenerative feedback control circuit for the preselected frequency $F \doteq nf_1$ from resonant circuit 20 is provided by means of a movable tap 46 adapted to be positioned along inductance 40 and which is coupled to cathode 14 through blocking capacitor 48. B+ voltage is applied to plate 12 through inductance 50 which is in series connection with inductance 26.

The circuit shown in Fig. 2 provides for simultaneous self-excitation of oscillations at two independent frequencies in a single tube, assuming of course that the fundamental requirement for such simultaneous oscillations is met, namely, that there is a relatively large ratio between the two frequencies. The values of capacitors 28 and 48 associated with resonant circuit 20 are chosen such that the reactances thereof at selected fundamental frequencies $f_1$ are high enough to reduce the shunt action of resonant circuit 18 upon resonant circuit 20. The grid-leak combination of capacitor 24 and resistor 30 and the position of tap 42 along inductance 36 are selected such that the desired fundamental oscillations $f_1$ are maintained at the maximal amplitude consistent with the specifications of tube 10. The values of inductances 22 and 26 associated with resonant circuit 18 are such that at any selected output frequency $f_0=nf_1$ they provide reactances high enough to reduce interference between the two simultaneous oscillations.

In the operation of the frequency spectrum generator shown in Fig. 2 the output energy at preselected frequency F from resonant circuit 20 is concentrated in the vicinity of the desired output multiple frequency $f_0=nf_1$. The fundamental oscillation applied to the grid voltage provides a bias such that there is provided a regenerative period and a degenerative period for the prescribed frequency F. In this manner the fundamental frequency $f_1$ periodically controls or keys the phase of the preselected frequency F so that the output coupled through coupling circuit 41 from resonant circuit 20 is $nf_1$. Thus, with a circuit as shown in Fig. 2, the multiple frequency $nf_1$ may be derived as a function of the fundamental frequency selected. For convenience, the resonant circuit 18 is designated as the phase controlling fundamental frequency circuit and the resonant circuit 20 is designated as the phase controlled multiple frequency circuit. The circuit hereinabove described is commonly referred to in the art as a periodically-phase-controlled oscillator (PPCO). The variation of the oscillation amplitude of the phase controlling oscillator section results in a change of operation from one mode characterized by the generation of substantially a single frequency output of the periodically-phase-controlled oscillator section to the spectrum generator mode wherein a limited number of adjacent harmonics having substantially the same amplitudes are generated. With the proper regenerative feedback from tap 42, the desired mode of operation may be established over a wide range of fundamental frequencies. Similarly, with the adjustment of the regenerative feedback from tap 46 it is possible to establish the mode of operation over a wide range of output frequencies. When the feedback from tap 46 is reduced by the movement thereof along inductance 40 towards the grid side of resonant circuit 20, the output oscillations $f_0$ will build up within a very few oscillation periods and continue at a constant amplitude for the duration of the regenerative period and, because of the high Q of resonant circuit 20, decay only little in the following degenerative period. This results in the multiplier mode output illustrated in Fig. 3. Increasing the feedback in the periodically-phase-controlled section broadens the bandwidth of the spectrum amplitude envelope so that there is produced a frequency spectrum output as shown in Fig. 4. Due to the large amplitude to which the periodically controlled oscillations build up at the increased feedback, an increase of the spectrum energy is available within a relatively narrow frequency band. Thus, the regenerative feedback from tap 46 determines the wave shape of the output oscillations $f_0$ and, therefore, the amplitude envelope of the output spectrum within the frequency range to which circuit 20 is tuned.

Referring now to Fig. 5, the frequency spectrum generator hereinabove described is shown connected as one component of the regenerative frequency divider circuit. The output $nf_1$ from phase controlled multiple frequency circuit 20 is applied to beat frequency detector 6 where it is compared with the frequency of the signal $F_D$ which is to be divided. The output of beat frequency detector 6 is applied to low-pass filter 7 which is adapted to pass a prescribed range of frequencies including the lowest one of the resulting beat frequencies. Beat frequency detector 6 is of the type known as a comparative discriminator which provides an output signal whose phase is related to the algebraic sign of the frequency error between $F_D$ and $nf_1$. If the signals applied to beat frequency detector 6 are equal in frequency, then the output therefrom will be a direct-current component. The output from low-pass filter 7 is applied to reactance modulator tube 8, the output of which is applied through capacitor 51 to phase controlling fundamental frequency circuit 18 to control the frequency thereof. By such an arrangement, the fundamental frequency will be varied in a direction to produce a multiple frequency $nf_1$ from circuit 20 which is equal to $F_D$, at which time the output from detector 6 will be a direct-current component to provide phase-lock between $nf_1$ and $F_D$.

In discussing the operation of the frequency regenerative divider circuit, let it be assumed that circuit 20 is tuned approximately to 60 mc. which is assumed to be the frequency, $F_D$, of the signal that is to be divided by factors of, say, 120, 100, 80, and 60, and which is applied as one input to beat frequency detector 6. The phase controlling fundamental frequency circuit 18 must be tunable over a frequency range that includes the desired subharmonics, which, in the assumed case are 500 kc., 600 kc., 750 kc., and 1 mc. Now, when the circuit is switched on, let it be assumed that the fundamental frequency $f_1$ of generator 5 is 500.5 kc. so that the 120th harmonic output from circuit 20 is 60.06 mc. Other frequencies simultaneously present in the output spectrum are $(n+k)f_1$ where $n$ and $k$ are integers ($n=120$, $k=0, 1, 2,$ etc.). These frequencies, spaced by 500.5 kc. above and below the harmonic output frequency $f_0=60.06$ mc., are fed into beat frequency detector circuit 6 to heterodyne with the 60 mc. input signal $F_D$. As a result, there is produced a correction voltage having a frequency of 60 kc. which passes through low-pass filter 7 to reactance modulator 8. Beat frequencies outside the pass band of the filter are suppressed. The output of reactance modulator 8 corrects the fundamental frequency $f_1$ to drive $f_0$ towards zero beat so that at the instant when $f_0=nf_1$ passes 60 mc., the phase of the utilized beat frequency component from detector 6 changes in phase by 180° to provide phase-lock or stable synchronism between $F_D$ and $nf_1$. Thus, the frequency of the fundamental oscillation $f_1$ in circuit 18 is established automatically to be the desired 120th subharmonic of the 60 mc. input signal which is to be divided. The subharmonic frequency may be coupled to a utilization circuit by means of transformer 52 or any other suitable coupling means. Division factors of 100, 80 and 60 may be obtained in a similar manner.

While there has been described what is at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A regenerative frequency divider circuit for producing a desired subharmonic of a prescribed oscillation frequency comprising, a periodically-phase-controlled oscillator including means for simultaneously generating a fundamental oscillation frequency and an oscillation frequency harmonically related thereto, said fundamental frequency being substantially equal to said desired subharmonic and controlling the harmonically related frequency such that the harmonic frequency is substantially equal to said prescribed frequency, means responsive to said prescribed frequency and said harmonic frequency for producing an output signal whose phase is dependent on the algebraic sign of the frequency error between said prescribed frequency and said harmonic frequency, and means in circuit with the fundamental oscillation generating means and responsive to said output signal for varying said fundamental frequency in such sense as to drive the harmonic frequency towards said prescribed frequency, said fundamental frequency being equal to said desired subharmonic when said prescribed frequency and said harmonic frequency are in phase-lock.

2. A regenerative frequency divider circuit for producing a desired subharmonic of a prescribed oscillation frequency comprising, a periodically-phase-controlled oscillator including means for simultaneously generating a fundamental oscillation frequency and an oscillation frequency harmonicaly related thereto, said fundamental frequency being substantially equal to said desired subharmonic and controlling the harmonically related frequency such that the harmonic frequency is substantially equal to said prescribed frequency, a beat frequency detector responsive to said prescribed frequency and said harmonic frequency for producing an output signal whose phase is dependent on the alegbraic sign of the frequency error between said prescribed frequency and said harmonic frequency signals and a direct current component of magnitude dependent on the phase difference between said signals when the frequencies thereof are equal, and means in circuit with the fundamental oscillator generating means and responsive to said output signal for varying said fundamental frequency in such sense as to drive said harmonic frequency towards said prescribed frequency, said fundamental frequency being equal to said desired subharmonic when said prescribed frequency and said harmonic frequency are in phase-lock.

3. The regenerative frequency divider in accordance with claim 2 wherein said last mentioned means comprises a reactance modulator·

4. A regenerative frequency divider circuit for producing a desired subharmonic of a prescribed oscillation frequency comprising, a frequency spectrum generator including a vacuum tube having at least a plate, a grid and a cathode, a first tuned circuit coupled between said plate and said grid for generating oscillations at a fundamental frequency substantially equal to said desired subharmonic, a second tuned circuit coupled between said plate and said grid for generating oscillations at a frequency substantially equal to a prescribed multiple of said fundamental frequency having a value substantially equal to said prescribed frequency, said oscillations being self-excited and simultaneously generated whereby the multiple frequency oscillation is keyed such that its phase is periodic at said fundamental frequency, means responsive to said prescribed frequency and said multiple frequency for producing an output signal whose phase is dependent on the alegbraic sign of the frequency error between said prescribed frequency and said multiple frequency, and means in circuit with said first tuned circuit and responsive to said output signal for varying said fundamental frequency in such sense as to drive the multiple frequency towards said prescribed frequency, said fundamental frequency being equal to said desired subharmonic when said prescribed frequency and said multiple frequency are in phase-lock.

5. A regenerative frequency divider circuit for producing a desired subharmonic of a prescribed oscillation frequency comprising, a frequency spectrum generator including a vacuum tube having at least a plate, a grid and a cathode, a first tuned circuit coupled between said plate and said grid for generating oscillations at a fundamental frequency substantially equal to said desired subharmonic, a second tuned circuit coupled between said plate and said grid for generating oscillations at a frequency substantially equal to a prescribed multiple of said fundamental frequency having a value substantially equal to said prescribed frequency, said oscillations being self-excited and simultaneously generated whereby the multiple frequency oscillation is keyed such that its phase is periodic at said fundamental frequency, a beat frequency detector responsive to said prescribed frequency and said multiple frequency for producing a beat frequency output signal whose phase is dependent on the algebraic sign of the frequency error between said prescribed and multiple frequency oscillations and a direct-current component of magnitude dependent on the phase difference between said oscillations when the frequencies thereof are equal, a low-pass filter adapted to pass a prescribed range of frequencies including the lowest of said beat frequency output signals, and a reactance modulator responsive to the output of said low-pass filter and in circuit with said first tuned circuit to vary the fundamental frequency whereby the multiple oscillation frequency is driven towards said prescribed frequency, said fundamental frequency being equal to said desired subharmonic when said prescribed frequency and said multiple frequency are in phase-lock.

References Cited in the file of this patent

UNITED STATES PATENTS

| | | |
|---|---|---|
| 2,496,994 | Goldberg | Feb. 7, 1950 |
| 2,738,423 | Sziklai | Mar. 13, 1956 |
| 2,777,064 | Robinson | Jan. 8, 1957 |